US007499526B2

(12) United States Patent
Brower et al.

(10) Patent No.: US 7,499,526 B2
(45) Date of Patent: Mar. 3, 2009

(54) TERMINATION MODULE INCLUDING SUBSCRIBER BRIDGE HAVING BURGLAR ALARM CONNECTIONS

(75) Inventors: Boyd G. Brower, Keller, TX (US); John J. Napiorkowski, Irving, TX (US); Brad N. Grunwald, Euless, TX (US)

(73) Assignee: Corning Cable Systems LLC, Hickory, NC (US)

( * ) Notice: Subject to any disclaimer, the term of this patent is extended or adjusted under 35 U.S.C. 154(b) by 917 days.

(21) Appl. No.: 10/926,804

(22) Filed: Aug. 26, 2004

(65) Prior Publication Data

US 2006/0023846 A1 Feb. 2, 2006

Related U.S. Application Data

(60) Provisional application No. 60/592,877, filed on Jul. 30, 2004.

(51) Int. Cl.
*H04M 1/24* (2006.01)
*H04M 3/08* (2006.01)
*H04M 3/22* (2006.01)

(52) U.S. Cl. .................. 379/37; 379/29.01; 379/413.02

(58) Field of Classification Search .................. 379/33, 379/37, 44, 399.01, 413.02, 413.04; 340/426.13, 340/426.18, 506, 510, 514
See application file for complete search history.

(56) References Cited

U.S. PATENT DOCUMENTS 5,333,193 A 7/1994 Cote et al. .................. 379/399
5,369,548 A * 11/1994 Combs ....................... 361/643
5,479,505 A 12/1995 Butler et al. ................ 379/412
5,519,756 A * 5/1996 Clift ........................... 379/44
5,548,641 A 8/1996 Butler et al. ................ 379/399
5,764,729 A * 6/1998 Black et al. ................... 379/44
5,888,085 A 3/1999 Meyerhoefer et al. ....... 439/188
6,061,428 A 5/2000 Andrews et al. .............. 379/27
6,099,333 A 8/2000 Daoud et al. ................ 439/188
6,249,580 B1 6/2001 Daoud ........................ 379/399
6,285,194 B1 9/2001 Daoud et al. ................ 324/522
6,500,020 B2 12/2002 Vo et al. ...................... 439/409
6,535,579 B1 3/2003 Blake et al. .............. 379/22.06
6,540,534 B2 4/2003 Vo et al. ...................... 439/188
2001/0000248 A1 4/2001 Daoud et al.
2001/0053625 A1 12/2001 Vo et al.

OTHER PUBLICATIONS

Tyco Electronics Raychem Spec Sheet, DataGuard SSB, 1999, 2 pages.

* cited by examiner

*Primary Examiner*—Binh K Tieu
(74) *Attorney, Agent, or Firm*—John H. Vynalek

(57) ABSTRACT

A termination module for terminating TELCO wiring and subscriber wiring within a network interface enclosure at a subscriber premises includes a subscriber bridge having burglar alarm connections. The subscriber bridge includes a base, a pair of conductive contact elements disposed within the base and defining a plurality of connection terminals, and a base cap positioned over the base and the contact elements. The termination module provides a demarcation point for electrically disconnecting the subscriber wiring from the subscriber wiring and the subscriber bridge further includes burglar alarm connection points that permit a burglar alarm to be wired in series between the demarcation point and the contact elements such that the subscriber-owned equipment, including the burglar alarm, can be electrically disconnected from the TELCO wiring to fault test a telephone line.

38 Claims, 10 Drawing Sheets

TERMINATION MODULE INCLUDING SUBSCRIBER BRIDGE HAVING BURGLAR ALARM CONNECTIONS

CROSS-REFERENCE TO RELATED APPLICATION

This application claims the benefit of U.S. Provisional Application No. 60/592,877, filed Jul. 30, 2004.

FIELD OF THE INVENTION

This invention relates generally to a termination module for terminating wiring in a communications network. More specifically, the invention relates to a termination module including a subscriber bridge having burglar alarm connections for interconnecting service provider wiring and subscriber wiring within a network interface enclosure.

BACKGROUND OF THE INVENTION

A communications service provider, such as a telephone company (TELCO), offers voice and data transmission services over a communications network. Customers of the TELCO, commonly referred to as "subscribers," may purchase as many communications services as they desire and equip their homes, businesses, or the like with communications equipment to utilize such services. Subscribers are responsible for proper operation of the communications equipment and the TELCO is responsible for proper operation of the communications network up to the electrical interface, commonly referred to as the "demarcation point," between the TELCO wiring and the subscriber wiring. The demarcation point is the location where the subscriber wiring can be electrically disconnected from the TELCO wiring to determine whether a fault in the telephone line originates in the TELCO-owned equipment (including the TELCO wiring) or in the subscriber-owned equipment (including the subscriber wiring). As such, the demarcation point must be accessible to both the subscriber and the TELCO, and therefore, is typically located at the subscriber site within a network interface enclosure, such as a network interface device (NID) or a building entrance terminal (BET) mounted on an exterior wall of a home, office, apartment or other commercial or residential building.

The NID or BET houses at least one, and oftentimes, a plurality of termination modules for interconnecting the TELCO wiring and the subscriber wiring. Each termination module typically services a single telephone line and includes one pair of connection terminals for terminating the TELCO wiring and one or more pairs of connection terminals for terminating the subscriber wiring. The connection terminals provided on the termination module for terminating the TELCO wring are commonly referred to as "TELCO terminals" and the connection terminals provided on the termination module for terminating the subscriber wiring are commonly referred to as "subscriber terminals" or "subscriber pairs." The TELCO terminals are typically located adjacent one end of the termination module in the NID or BET beneath a lockable cover that is accessible only to authorized TELCO personnel (e.g., an installer or a field service technician), and therefore, is commonly referred to as the "TELCO compartment." Conversely, the subscriber terminals are typically located on the termination module within a portion of the NID or BET commonly referred to as the "subscriber compartment" that is accessible to both the TELCO personnel and the subscriber. The termination module typically further includes some type of electrical circuitry (e.g. half ringer) and/or electrical protection component (e.g., metal oxide varistor (MOV) or gas tube) that is electrically connected with the telephone line signal before the demarcation point. The electrical protection component, commonly referred to as a "protector," may be integral with the termination module or may be located separately from the termination module, for example in the TELCO compartment. The subscriber pairs are accessed in most NIDs or BETs from above the termination module so that an installer or field service technician can readily terminate the subscriber wring to establish electrical connections with the termination module. Due in part to the limited amount of space within the subscriber compartment, only a small number of termination modules, and consequently, only a limited number of subscriber pairs, are available for connection to the subscriber wiring.

A known protected terminating device (PTD) is shown and described in U.S. Pat. No. 6,500,020 and available from Corning Cable Systems LLC of Hickory, N.C. After the PTD was introduced, subscribers and security system service providers began requesting electrical connections on the PTD for a security system burglar alarm. Burglar alarm connections must be made within the subscriber compartment of the NID or BET since the burglar alarm is subscriber-owned equipment that must be accessible to the subscriber and the security system service provider. According to a government regulation, the burglar alarm connections must also be made after the demarcation point so that the subscriber can electrically disconnect all subscriber-owned equipment, including the burglar alarm, to fault test the telephone line signal from the TELCO. Furthermore, the burglar alarm connections should be wired in series between the demarcation point and the first subscriber pair connected to the subscriber-owned communications equipment (e.g., telephone, telephone extension, facsimile, computer, etc.) so that the burglar alarm relay circuit can override the subscriber's communications equipment and seize control of the telephone line to send an alarm signal to the security system service provider. Due to the limited number of subscriber pairs available for each telephone line, it is undesirable to insert the wire pair leading to the burglar alarm and the wire pair returning from the burglar alarm into the first and second sets of subscriber pairs because the burglar alarm wire pairs would therefore occupy two of the four sets of subscriber pairs typically available on the PTD.

As with other termination modules, there is only limited access on the PTD to the wiring between the demarcation point and the subscriber pairs. As a result, the installer for the security system service provider may attempt to cut the wiring before the demarcation point, for example between the protector and the demarcation point, and physically splice the wire pairs leading to and returning from the burglar alarm into the telephone line. This field wiring solution is particularly likely when the protector is located separately from the termination module in the TELCO compartment. Electrically connecting the burglar alarm in series before the demarcation point, however, does not permit the subscriber to disconnect the burglar alarm to fault test the telephone line signal from the TELCO. Thus, in the event of a telephone line service problem, the subscriber cannot determine whether the telephone line fault is being caused by the spliced-in subscriber-owned burglar alarm or by the TELCO-owned equipment. As a result, the government regulation requiring isolation of all subscriber-owned equipment from the telephone line signal is violated. On the PTD termination module, it is also possible for the security system field installer to cut the line cord extending between the demarcation point and the subscriber terminals and to physically splice the wire pairs leading to and returning from the burglar alarm into the telephone line. While this alternate field wiring solution satisfies the government demarcation regulation, it is extremely difficult to accomplish given the limited space available on the PTD and presents further problems relating to management of the line cord, the line cord splices and any additional burglar alarm connections.

An existing solution that satisfies the aforementioned problems is illustrated in FIG. 1A and FIG. 1B. The subscriber bridge 20 portion of the PTD (shown in FIG. 2 and FIG. 3A at 15) includes a base 30, a pair of conductive contact elements 40 disposed within the base, and a base cap 50 positioned over the base and the contact elements. The contact elements 40 define a plurality of pairs of insulation displacement contact (IDC) type connection terminals 42, 44, 46, 48 for terminating the subscriber wiring. The connection terminals 42, 44, 46, 48 are accessible through wire insertion holes 52 provided on the base cap 50 and are commonly referred to as "subscriber terminals" or "subscriber pairs." A cover 60 is rotatably attached to the base 30 and movable between a closed position and an opened position. The cover 60 has a pair of conductive contacts 65 disposed on the underside of the cover adjacent the forward end 62 of the cover. The contacts 65 are not visible in FIG. 1A, but are represented schematically on the wiring diagram of FIG. 1B. A line cord 70 containing a conductive line cord wire pair (represented schematically in FIG. 1B at 72) is electrically connected between the contacts 65 and the contact elements 40 disposed within the base 30. When the cover 60 is in the closed position shown in FIG. 1A, the contacts 65 engage corresponding conductive contacts 65' (FIG. 1B) disposed in an RJ-11 jack on a PTD module base (shown in FIG. 3A at 18) to form a normally-closed switch that electrically connects the subscriber wiring and the TELCO wiring. When the cover 60 is moved to the opened position, the normally-closed switch is opened (as indicated by the broken lines in FIG. 1B) and electrically disconnects the line cord 70 (i.e., line cord wire pair 72), thereby disconnecting the subscriber wiring from the TELCO wiring. As such, the RJ-11 jack provides a demarcation point between the subscriber-owned equipment and the TELCO-owned equipment that allows a subscriber to determine whether a fault on the telephone line exists in the TELCO network.

Referring now to FIG. 1B, a conductive wire pair 12 from the TELCO network is electrically connected to a pair of connection terminals 14 provided on the PTD for terminating the TELCO wiring (i.e., TELCO terminals). The connection terminals 14 are electrically connected to the contacts 65' disposed in the RJ-11 jack on the PTD module base 18. Normally (i.e., when the cover is in the closed position), the contacts 65' are electrically connected to the corresponding contacts 65 disposed on the underside of the cover 60. The line cord wire pair 72 is therefore electrically connected between the contacts 65 and the contact elements 40 disposed within the base 30 of the subscriber bridge 20. The contact elements 40, however, are physically separated into first contact elements 40*a* defining first subscriber pair 42 and second contact elements 40*b* defining the remaining subscriber pairs 44, 46, 48. Thus, the first subscriber pair 42 is electrically isolated from the remaining subscriber pairs 44, 46, 48. A conductive wire pair 82 leading to a burglar alarm relay circuit 80 is electrically connected between the first subscriber pair 42 and a pair of conductive contacts 85 disposed on the burglar alarm relay circuit. A conductive wire pair 84 returning from the burglar alarm relay circuit 80 to the subscriber bridge 20 is electrically connected between the second subscriber pair 44 and a pair of conductive contacts 85' disposed on the burglar alarm relay circuit. Conductive wire pairs 96, 98 leading to subscriber-owned communications equipment, such as a telephone, telephone extension, facsimile or computer, are terminated to the third subscriber pair 46 and fourth subscriber pair 48, respectively, remaining on the subscriber bridge 20.

The contacts 85 are electrically connected to the corresponding contacts 85' to form a normally-closed switch. Accordingly, when the cover 60 is closed and contacts 65 engage contacts 65', the telephone line signal from the TELCO network travels along the line cord wire pair 72 to the contact elements 40*a* that define the first subscriber pair 42. The telephone line signal then travels along the wire pair 82 through the contacts 85 and 85' and along the wire pair 84 to the second subscriber pair 44 defined by the contact elements 40*b*. As a result, the wire pairs 96, 98 leading to the subscriber-owned communications equipment that are terminated to the third and fourth subscriber pairs 46, 48, respectively, are electrically connected to the telephone line signal. When the cover 60 is opened and contacts 65 disengage from contacts 65', the line cord wire pair 72 is electrically disconnected from the TELCO network. As a result, the wire pairs 82, 84 leading to and returning from the burglar alarm and the wire pairs 96, 98 leading to the subscriber-owned communications equipment are electrically disconnected from the telephone line signal. Thus, the demarcation point (i.e., the normally-closed switch defined by contacts 65 and contacts 65') isolates all of the subscriber-owned equipment, including the burglar alarm, from the TELCO network to permit the subscriber to fault test the telephone line signal. While this field wiring solution satisfies the government demarcation regulation, isolating the first subscriber pair 42 from the remaining subscriber pairs 44, 46 48 must be accomplished in the factory at the time the PTD is manufactured and assembled. Unfortunately, the current design of the PTD does not readily permit the first subscriber pair 42 to be physically separated from the remaining subscriber pairs 44, 46, 48 and separately retained within the base 30 of the subscriber bridge 20.

SUMMARY OF THE INVENTION

The present invention is a termination module, such as a line module, network terminating device, or PTD for interconnecting TELCO wiring and subscriber wiring, including a subscriber bridge having burglar alarm connections. Generally, the termination module includes a pair of connection terminals for terminating the TELCO wiring and one or more pairs of connection terminals for terminating subscriber wiring electrically connected to subscriber-owned communications equipment, such as a telephone, telephone extension, facsimile, computer, etc. The termination module interconnects the TELCO wiring and the subscriber wiring to permit the subscriber to access voice and data transmission services offered by the TELCO. A termination module and subscriber bridge according to the invention also generally includes means for terminating subscriber wiring leading to and returning from additional subscriber-owned equipment, such as a burglar alarm for a security system.

In one aspect of the invention, a termination module is disposed within a network interface enclosure having a housing defining an interior compartment. The termination module includes a subscriber bridge and provides a demarcation point between the TELCO wiring and the subscriber wiring. The subscriber bridge includes a base, a pair of conductive contact elements disposed within the base and defining one or more pairs of connection terminals for terminating the subscriber wiring, and a base cap positioned over the base and the contact elements. The subscriber bridge further includes a first wire pair electrically connected to the demarcation point, and a second wire pair electrically connected to the contact elements. Alternatively, the second wire pair may be electrically connected to a first pair of the connection terminals defined by the contact elements. The first wire pair and the second wire pair electrically connect subscriber-owned equipment, such as a burglar alarm, in series with the termination module between the demarcation point and the contact elements to permit the subscriber-owned equipment to be disconnected from the TELCO wiring. The termination module may further include a module base having an electrically conductive jack and a cover disposed over the base cap and movably attached to the base of the subscriber bridge. The cover may include an electrically conductive plug for engaging the jack to establish the demarcation point between the TELCO wiring and the subscriber wiring.

In another aspect of the invention, a termination module for interconnecting TELCO wiring and subscriber wiring includes a subscriber bridge. The subscriber bridge includes a base, a pair of conductive contact elements disposed within the base and defining one or more pairs of connection terminals, and a base cap positioned over the base and the contact elements. The subscriber bridge further includes a first wire pair electrically connected to the demarcation point and a second wire pair electrically connected to the contact elements. Alternatively, the second wire pair may be electrically connected to a first pair of the connection terminals defined by the contact elements. The ends of the first wire pair opposite the demarcation point may be provided with first connection points for receiving a wire pair leading to a burglar alarm. The ends of the second wire pair opposite the contact elements or the first pair of connection terminals may be provided with second connection points for receiving a wire pair returning from the burglar alarm. The first wire pair and the wire pair leading to the burglar alarm are electrically connected through the first connection points, and the second wire pair and the wire pair returning from the burglar alarm are electrically connected through the second connection points such that the burglar alarm is electrically connected in series between the demarcation point and the contact elements of the subscriber bridge to thereby permit the burglar alarm to be disconnected from the TELCO wiring. The termination module may further include a module base having an electrically conductive jack and a cover disposed over the base cap and movably attached to the base. The cover may include an electrically conductive plug for engaging the jack to establish the demarcation point between the TELCO wiring and the subscriber wiring.

In yet another aspect, the present invention is a method of wiring a subscriber bridge of a termination module to provide a demarcation point between the TELCO wiring and the subscriber wiring. The subscriber bridge includes burglar alarm connections for electrically connecting a burglar alarm in series with the termination module such that the subscriber-owned equipment, including the burglar alarm, can be electrically disconnected from the TELCO wiring to fault test a telephone line. The method includes the first step of providing the subscriber bridge with a pair of contact elements defining a plurality of pairs of connection terminals. The method includes the second step of electrically connecting a conductive first wire pair to the subscriber bridge between a normally-closed switch provided at the demarcation point and a normally-closed switch provided on a burglar alarm relay circuit. The method includes the third step of electrically connecting a conductive second wire pair between the normally-closed switch provided on the burglar alarm relay circuit and the contact elements. Alternatively, the second wire pair may be electrically connected between the normally-closed switch provided on the relay circuit and the first pair of the plurality of pairs of connection terminals defined by the contact elements.

In yet another aspect, the present invention is a method of electrically connecting a burglar alarm in series with a termination module for interconnecting TELCO wiring and subscriber wiring such that the burglar alarm can be disconnected to fault test a telephone line. The method includes the first step of providing a subscriber bridge having burglar alarm connections wherein the subscriber bridge includes a base, a pair of conductive contact elements disposed within the base and defining a plurality of pairs of connection terminals, and a base cap positioned over the base and the contact elements. The method includes the second step of providing burglar alarm first connection points for terminating a wire pair leading to the burglar alarm, the first connection points being electrically connected to the demarcation point on the subscriber bridge. Alternatively, the wire pair leading to the burglar alarm may be directly electrically connected to the demarcation point, for example by soldering or other suitable means. The method includes the third step of providing burglar alarm second connection points for terminating a wire pair returning from the burglar alarm, the second connection points being electrically connected to the contact elements. Alternatively, the wire pair returning from the burglar alarm may be directly electrically connected to the contact elements, for example by soldering or other suitable means, or to the first pair of the plurality of pairs of connection terminals. Thus, when the wire pair leading to the burglar alarm is electrically connected to the burglar alarm first connection points, and the wire pair returning from the burglar alarm is electrically connected to the burglar alarm second connection points, the burglar alarm is electrically connected in series between the demarcation point and the contact elements of the subscriber bridge. Furthermore, at least one of the first and second connection points may be a double sided IDC.

In yet another aspect, the present invention is a method of converting a termination module including a module base and a subscriber bridge that provide a demarcation point between TELCO wiring and subscriber wiring to electrically connect a burglar alarm in series with the termination module, the subscriber bridge having a line cord electrically connecting the demarcation point and a pair of conductive contact elements defining a plurality of pairs of connection terminals. The method includes the first step of removing the line cord, for example by cutting the line cord adjacent the demarcation point and adjacent the contact elements. The method includes the second step of providing burglar alarm first connection points for receiving a wire pair leading to the burglar alarm, the first connection points being electrically connected to the demarcation point. Alternatively, the wire pair leading to the burglar alarm may be directly electrically connected to the demarcation point, for example by soldering or other suitable means. The method includes the third step of providing burglar alarm second connection points for terminating a wire pair returning from the burglar alarm, the second connection points being electrically connected to the contact elements. Alternatively, the wire pair returning from the burglar alarm may be directly electrically connected to the contact elements, for example by soldering or other suitable means, or to the first pair of the plurality of pairs of connection terminals. Thus, when the wire pair leading to the burglar alarm is electrically connected to the burglar alarm first connection points, and the wire pair returning from the burglar alarm is electrically connected to the burglar alarm second connection points, the burglar alarm is electrically connected in series between the demarcation point and the contact elements of the subscriber bridge. Furthermore, at least one of the first and second connection points may be a double sided IDC.

BRIEF DESCRIPTION OF THE DRAWINGS

The above and other aspects and advantages of the invention will become apparent when the detailed description provided below is read in conjunction with the accompanying drawing in which.

DETAILED DESCRIPTION OF THE INVENTION

Figure 1A:
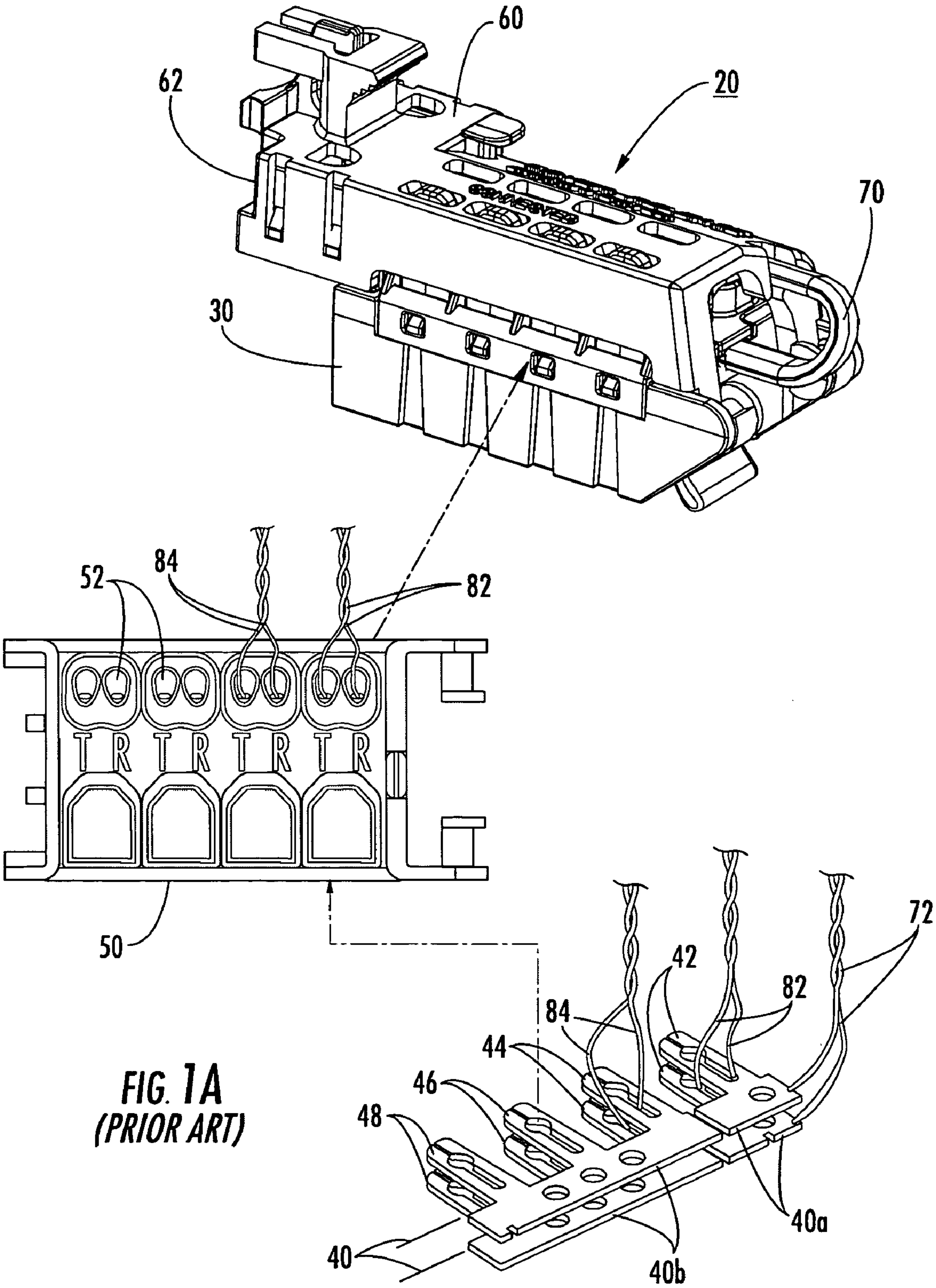
FIG. 1A (PRIOR ART)
FIG. 1A is an exploded perspective view of a subscriber bridge for an existing termination module illustrating a known solution for electrically connecting a burglar alarm in series with the termination module such that the burglar alarm can be electrically disconnected to fault test a telephone line.

Detailed reference will now be made to the accompanying drawings in which exemplary embodiments of the present invention are shown and illustrated. The detailed description uses reference numeral designations to refer to features depicted in the drawings. Like or similar designations in the drawings and description have been used to refer to like or similar parts of the invention. The drawings and detailed description provide a full and written disclosure of the invention, and of the manner and process of making and using it, so as to enable one skilled in the pertinent art to practice the invention without undue experimentation. The drawings and detailed description further provide a full and written disclosure of the best mode of carrying out the invention known to the named inventors at this time. However, the examples set forth in the drawings and detailed description are provided merely for the purpose of enabling and disclosing the best mode of the invention and are not intended to be construed as limiting the invention in any manner. The present invention thus includes any modifications and variations of the following exemplary embodiments and their equivalents as come within the scope of the appended claims.

Figure 2:
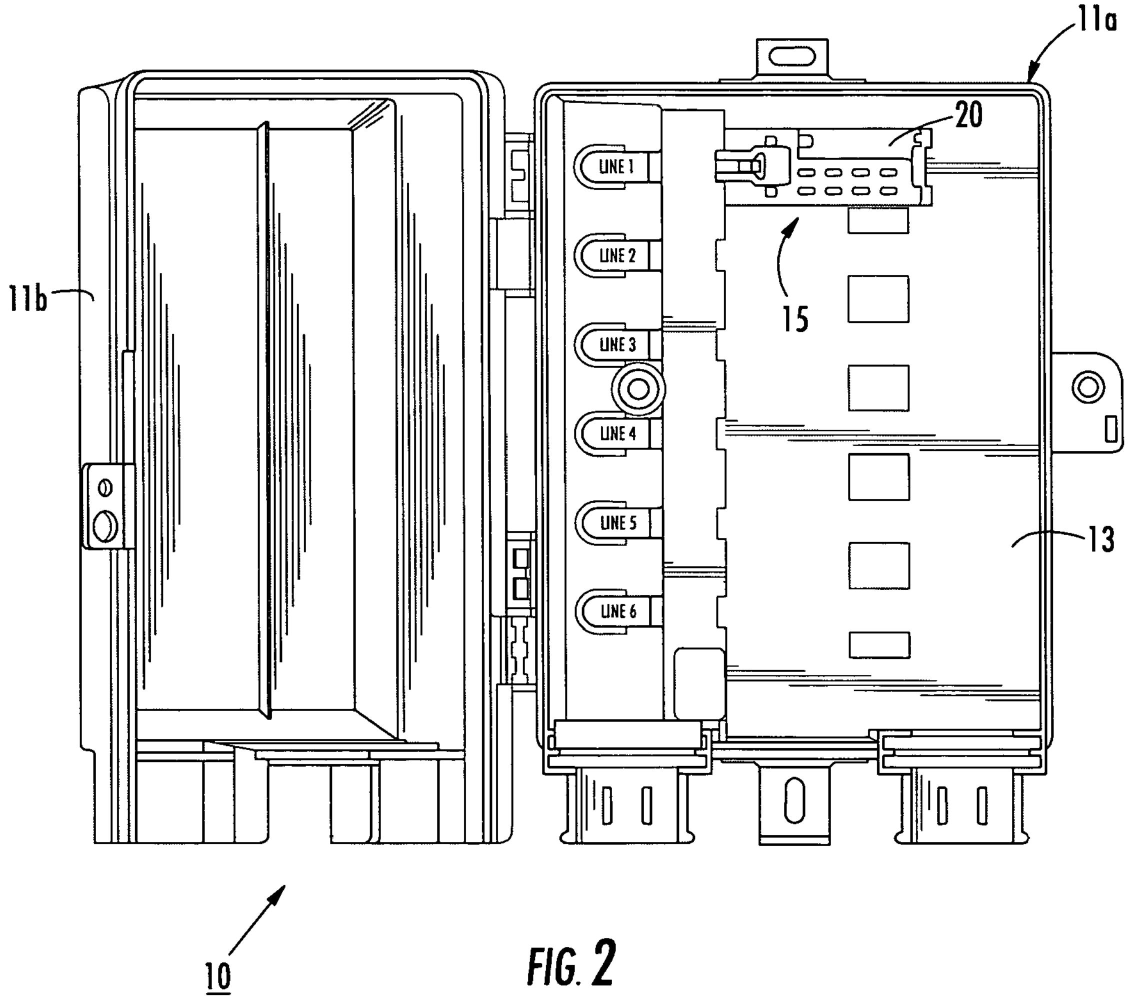
FIG. 2 is a front elevation view of a network interface enclosure having an interior compartment for housing one or more termination modules showing a typical termination module mounted within the interior compartment.

Referring to FIG. 2, a PTD type termination module 15 is shown installed in a network interface enclosure 10, and more particularly, in a conventional NID housing adapted for mounting on the exterior wall of a subscriber premises. The network interface enclosure 10 comprises a housing 11*a* defining an interior compartment 13 and a cover 11*b* that is movably mounted on the housing to provide access to the termination module 15. The termination module 15 shown and described herein is also referred to in the art as an interconnect module, a connector module, a wiring module, a customer bridge or a terminating device. As used herein, the term "termination module" is intended to include any such apparatus for terminating and/or interconnecting TELCO wiring and subscriber wiring in a communications network at a subscriber premises. The termination module 15 generally includes a module base 18 and a subscriber bridge 20 that is mounted on the module base in the manner illustrated in FIG. 3A. The module base 18 comprises conventional mounting features for securing and electrically grounding the termination module 15 within the interior 13 of the network interface enclosure 10. Such features are well within the knowledge and understanding of one skilled in the art and will not be further described.

As previously described, a conductive wire pair 12 from the TELCO network is electrically connected to a pair of conductive connection terminals (shown schematically in FIGS. 1B, 3C and 4C at 14) commonly referred to as "TELCO terminals" provided on the module base 18 for terminating the TELCO wiring to the termination module 15. As will be described in greater detail hereinafter, the subscriber bridge 20 comprises a pair of conductive contact elements 40 that define a plurality of pairs of connection terminals 42, 44, 46, 48 commonly referred to as "subscriber terminals" or "subscriber pairs" for terminating the subscriber wiring to the termination module 15. The connection terminals 14 are electrically connected to a pair of conductive contacts (shown schematically in FIGS. 1B, 3C and 4C at 65') provided in an RJ-11 jack on the module base 18 of the termination module 15. The contact elements 40 are electrically connected to a pair of conductive contacts (shown schematically in FIGS. 1B, 3C and 4C at 65) provided on the subscriber bridge 20 of the termination module 15. The contacts 65 engage the contacts 65' to form a normally-closed switch that electrically interconnects the TELCO wiring and the subscriber wiring.

The subscriber wiring is terminated to the subscriber pairs 42, 44, 46, 48 on the subscriber bridge 20 to electrically connect subscriber-owned communications equipment, such as a telephone, telephone extension, facsimile, computer, etc., to the TELCO network so that the subscriber may access the various communications services provided by the TELCO. As previously described, two of the subscriber pairs 42, 44, 46, 48 may be utilized to terminate wire pairs leading to and returning from a burglar alarm so that the subscriber may access a telephone line on the TELCO network to contact a security system service provider in the event of an emergency. However, wiring the burglar alarm to the subscriber bridge 20 in this manner reduces the number of subscriber pairs available for terminating the subscriber-owned communications equipment. Known apparatus and methods that do not utilize the subscriber pairs to terminate the burglar alarm wire pairs either violate the government demarcation regulation or are impractical to implement on a conventional termination module 15, and in particular, on the PTD type termination module available from Corning Cable Systems LLC of Hickory, N.C. The present invention provides a termination module 15 including a subscriber bridge 20 having burglar alarm connections that satisfies the government demarcation regulation, yet does not utilize two of the subscriber pairs 42, 44, 46, 48 and can be readily implemented in a factory manufacturing or field installation environment.

Figure 3A:
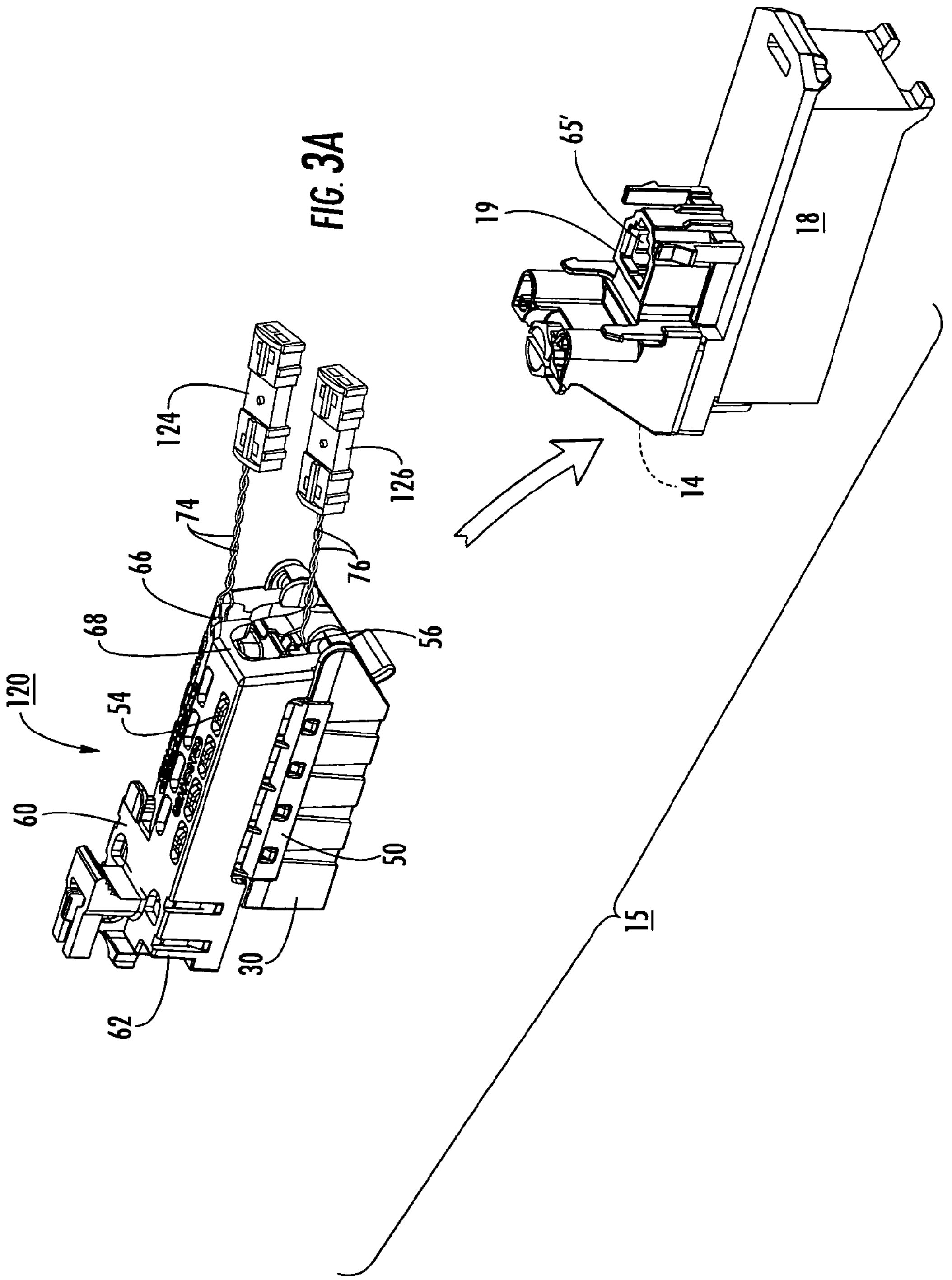
FIG. 3A is an exploded perspective view of a subscriber bridge having burglar alarm connections according to the present invention and a module base for receiving the subscriber bridge to form a PTD type termination module according to the present invention.
Figure 3B:
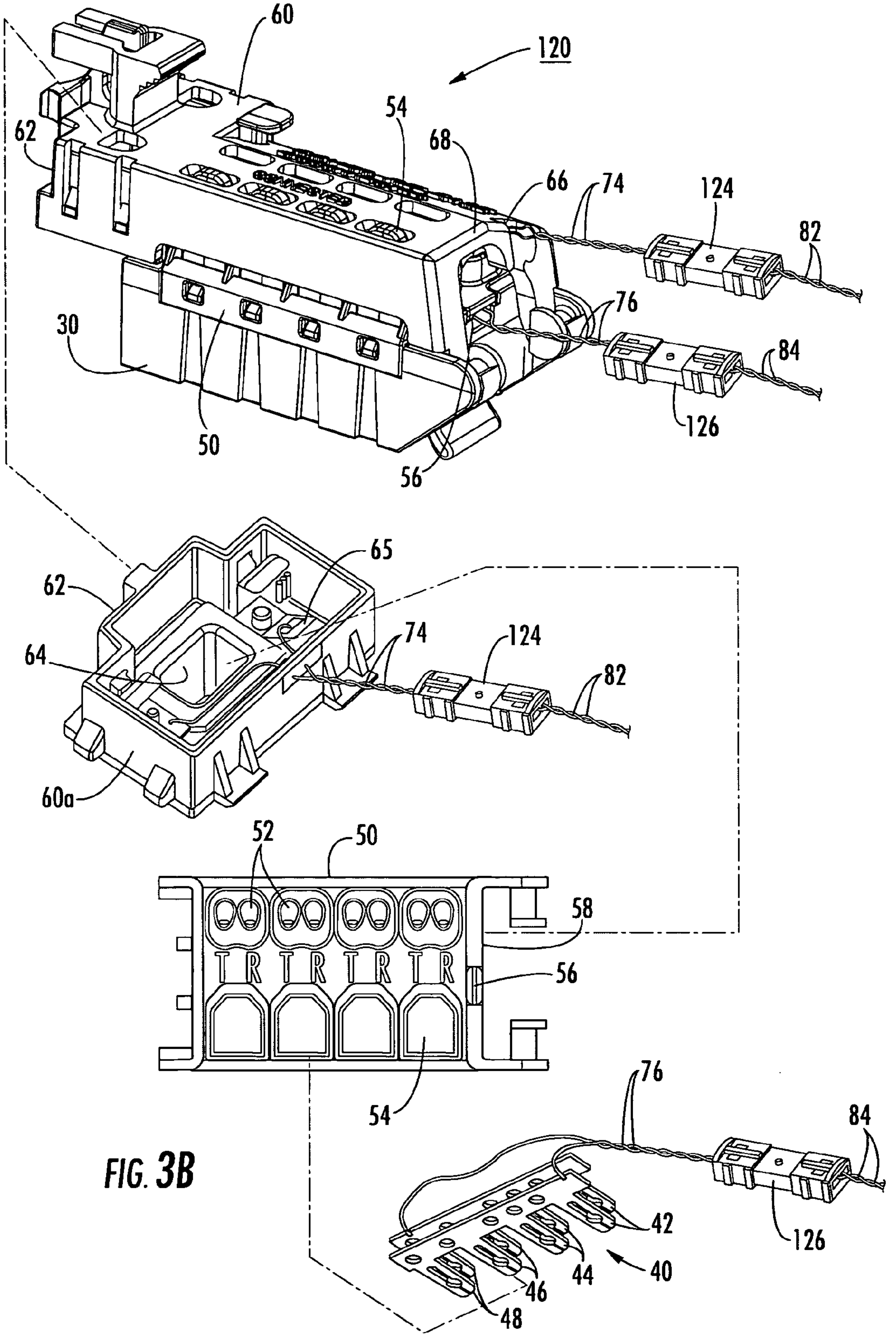
FIG. 3B is an exploded perspective view of the subscriber bridge of FIG. 3A showing the burglar alarm connections in greater detail.
Figure 3C:
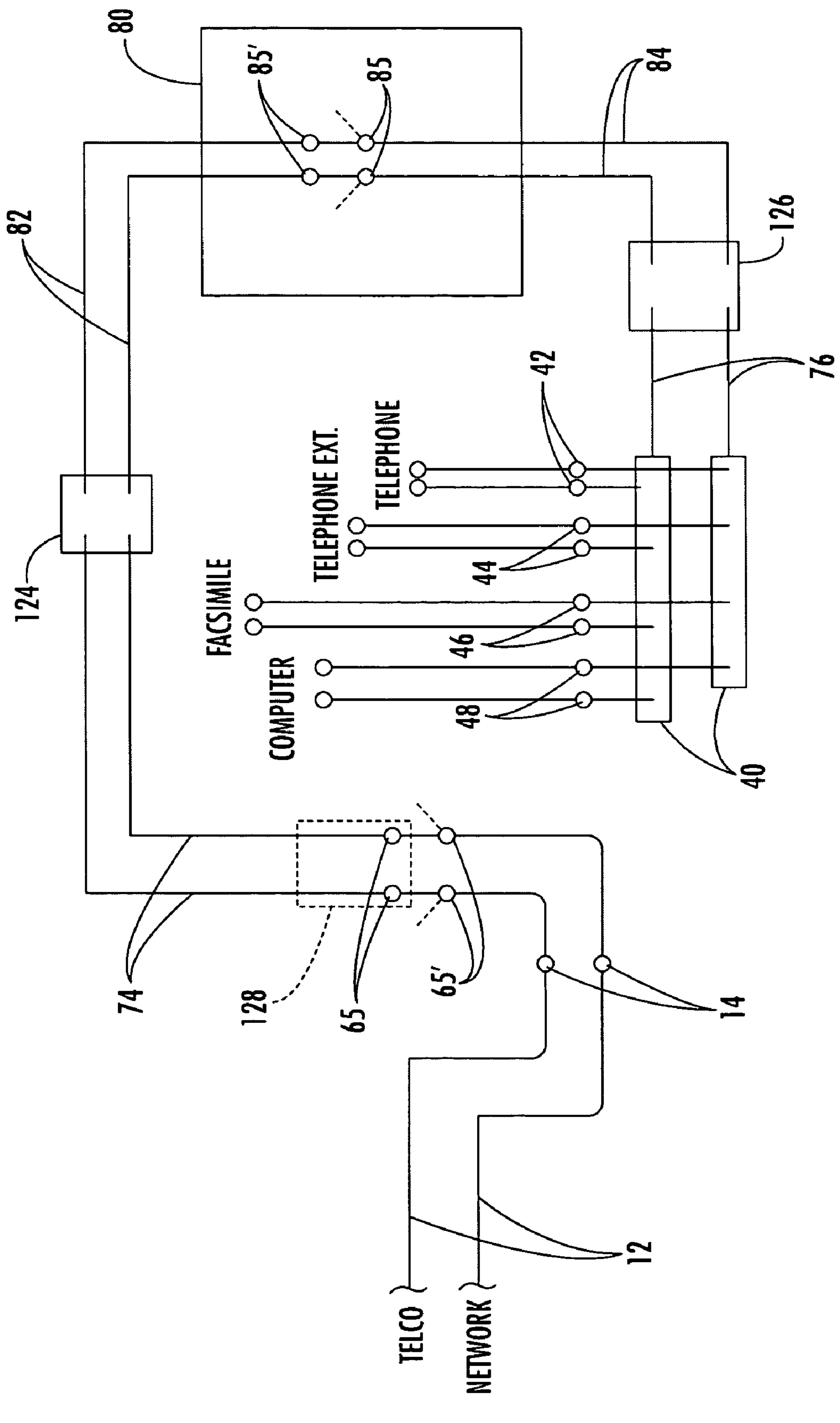
FIG. 3C is a schematic wiring diagram for the subscriber bridge of FIG. 3A and a burglar alarm relay circuit wired in series between the demarcation point and the first subscriber pair electrically connected to subscriber-owned communications equipment such that the burglar alarm can be electrically disconnected to test a telephone line.

An exemplary embodiment of a termination module 15 including a subscriber bridge 120 having burglar alarm connections according to the present invention is shown in FIGS. 3A and 3B. FIG. 3C is a schematic wiring diagram for the subscriber bridge 120 shown in FIGS. 3A and 3B. The subscriber bridge 120 comprises a base 30, a pair of conductive contact elements 40 disposed within the base, and a base cap 50 positioned over the base and the contact elements. The contact elements 40 define a plurality of conductive connection terminals 42, 44, 46, 48 referred to herein as "subscriber terminals" or "subscriber pairs." As shown, the subscriber pairs 42, 44, 46 48 are conventional insulation displacement contact (IDC) type electrical terminations having apertures for receiving an insulated twisted wire pair. The wire pair is forced out of the apertures into a reduced diameter slot that strips the insulation from the wire pair to electrically connect the wire pair to the subscriber pair. Although IDC type subscriber pairs are shown and described, any known connection terminals (e.g., conductive screw terminals, stubs, clips, etc.) may be utilized to terminate the subscriber wiring to the subscriber bridge 120. Likewise, any known connection terminals may be utilized to terminate the TELCO wiring to the termination module 15 without departing from the intended scope of the invention. Such connection terminals are well within the knowledge and understanding of one skilled in the art and will not be further described. As shown, the contact elements 40 comprise a pair of IDC strips that are disposed within the base 30 parallel and vertically spaced apart, but offset lengthwise so that the apertures are aligned with respective pairs of wire insertion openings 52 provided in the base cap 50. Wire pairs leading to subscriber-owned communications equipment are terminated to the subscriber bridge 120 by inserting the wire pair into an available subscriber pair 42, 44, 46, 48 through the corresponding pair of wire insertion openings 52 and engaging a stuffer, lever or the like 54 to move the wire pair from the respective apertures into the corresponding slots.

Figure 1B:
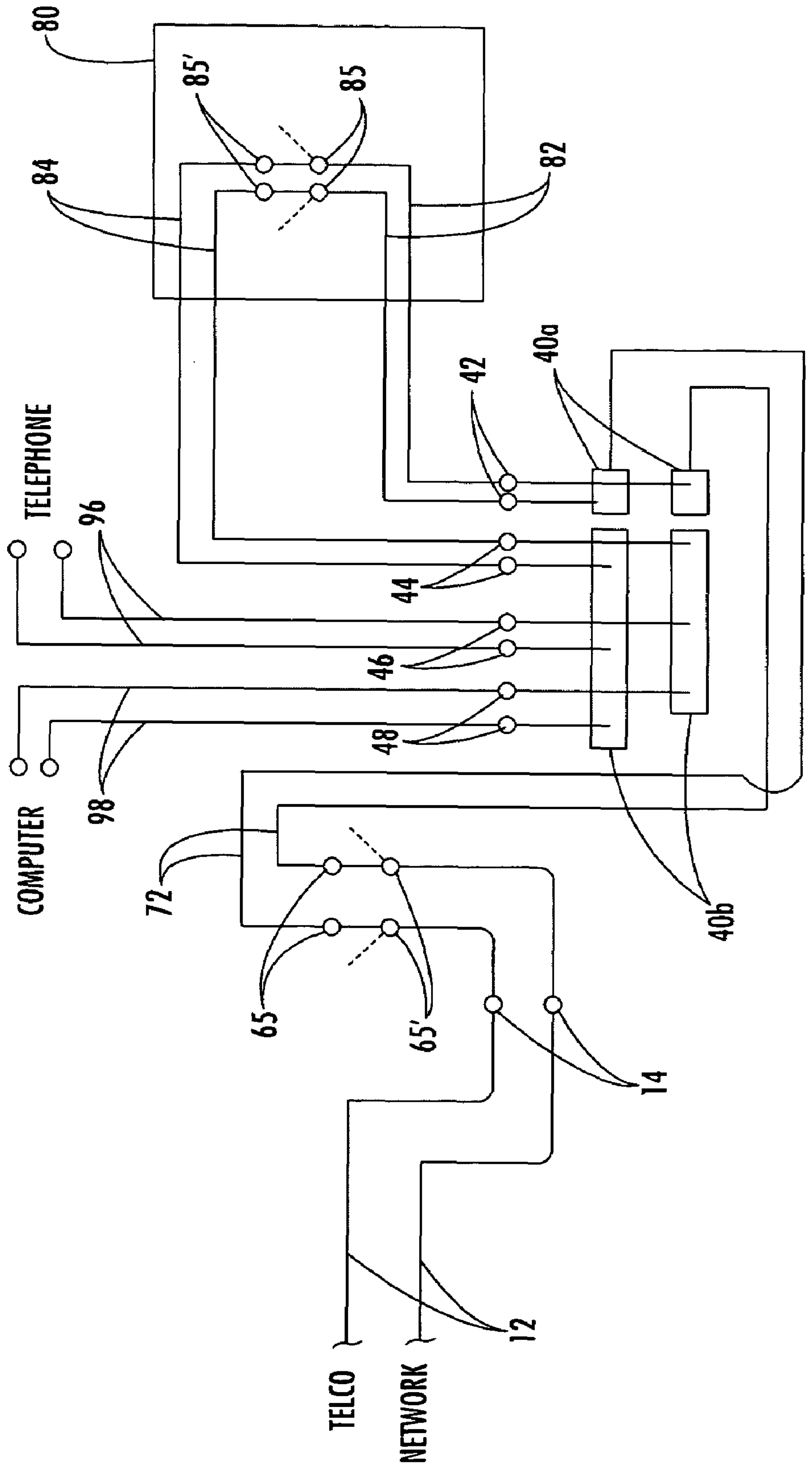
FIG. 1B (PRIOR ART)
FIG. 1B is a schematic wiring diagram for the subscriber bridge of FIG. 1A and a burglar alarm relay circuit wired in series between the demarcation point and the first subscriber pair electrically connected to subscriber-owned communications equipment such that the burglar alarm can be electrically disconnected to fault test a telephone line.

Unlike the subscriber bridge 20 of the PTD shown in FIG. 1A, the subscriber bridge 120 of the present invention does not comprise a line cord 70 having a line cord wire pair 72 that extends between the contacts 65 on the underside of the cover 60 and the contact elements 40. Instead, the subscriber bridge 120 shown in FIGS. 3A and 3B is configured with burglar alarm connections for electrically connecting a burglar alarm in series between the demarcation point and the contact elements 40. More specifically, the burglar alarm connections permit the conductive wire pair 82 leading to the burglar alarm to be electrically connected between the demarcation point and the burglar alarm relay circuit 80, and the conductive wire pair 84 returning from the burglar alarm to be electrically connected between the burglar alarm relay circuit 80 and the contact elements 40. As shown in FIG. 3B and illustrated schematically in FIG. 3C, a conductive first wire pair 74 is electrically connected, for example by soldering or other suitable means, to the pair of contacts 65 on the underside of the cover 60 of the subscriber bridge 120 adjacent the forward end 62 of the cover. The contacts 65 are disposed on a plug insert 60*a* that is inserted into the underside of the cover 60 adjacent the forward end 62. Preferably, the contacts 65 comprise conductors formed on a plug 64 that engages a corresponding RJ-11 jack 19 (FIG. 3A) formed in the upper surface of the module base 18. The contacts 65' likewise comprise conductors formed on the inside of the jack 19 such that contacts 65 are electrically coupled with the contacts 65' to form a normally-closed switch when the cover 60 is in the closed position, as shown. When the cover 60 is opened, the contacts 65 on the plug 64 are electrically uncoupled from the contacts 65' at the jack 19 to provide the demarcation point between the TELCO wiring and the subscriber wiring.

A conductive second wire pair 76 is electrically connected, for example by soldering or other suitable means, to the contact elements 40 disposed within the base 30 of the subscriber bridge 120. The first wire pair 74 extends rearwardly from the plug insert 60*a* between the top of the base cap 50 and the underside of the cover 60 through an opening 66 formed on the rearward end 68 of the cover. Similarly, the second wire pair 76 extends from the contact elements 40 through an opening 56 formed on the rearward end 58 of the base cap 50. As shown, the first wire pair 74 and the second wire pair 76 each terminate in a double-sided IDC type connector 124 and 126, respectively. The connectors 124, 126 provide convenient factory-prepared burglar alarm connection points for respectively receiving the wire pair 82 leading to the burglar alarm and the wire pair 84 returning from the burglar alarm. Accordingly, an installer for the security system service provider can readily electrically connect the burglar alarm relay circuit 80 to the termination module 15 in series between the demarcation point and the contact elements 40. The connectors 124, 126, however, are not required and the installer may instead hard-wire the wire pair 82 directly to the contacts 65 on the underside of the cover 60 and hard-wire the wire pair 84 directly to the contact elements 40 disposed within the base 30. Regardless, all four of the subscriber pairs (i.e., 42, 44, 46 and 48) remain available to terminate the subscriber-owned communications equipment. At the same time, all of the subscriber-owned equipment, including the burglar alarm, is electrically disconnected from the TELCO network when the cover 60 is opened so that a subscriber may fault test a telephone line on the termination module 15.

Figure 4A:
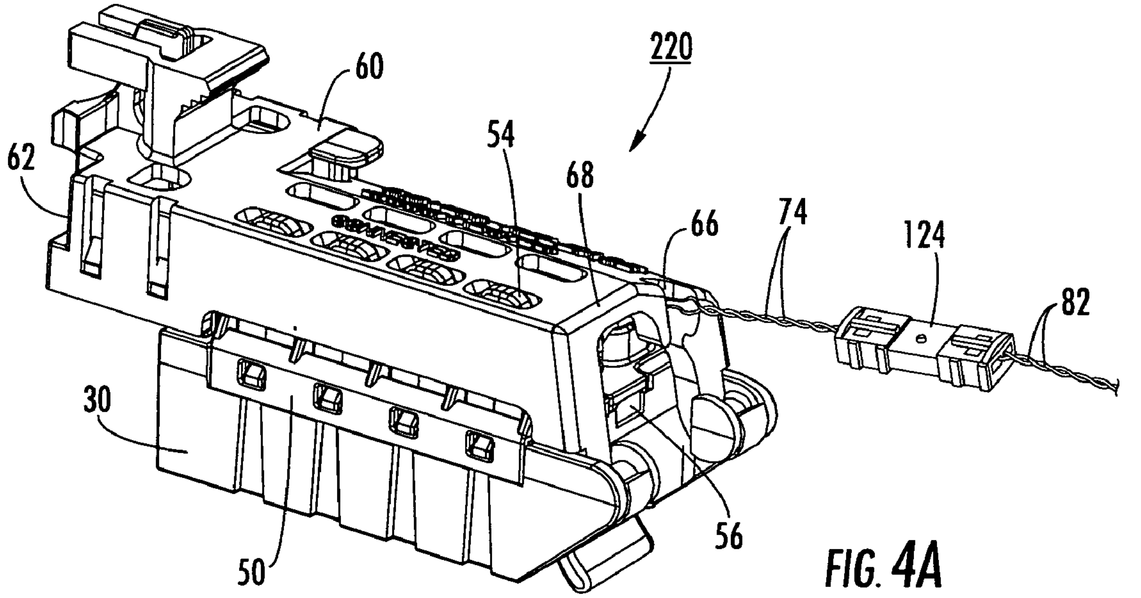
FIG. 4A is a perspective view of another exemplary embodiment of a subscriber bridge having burglar alarm connections according to the present invention.
Figure 4B:
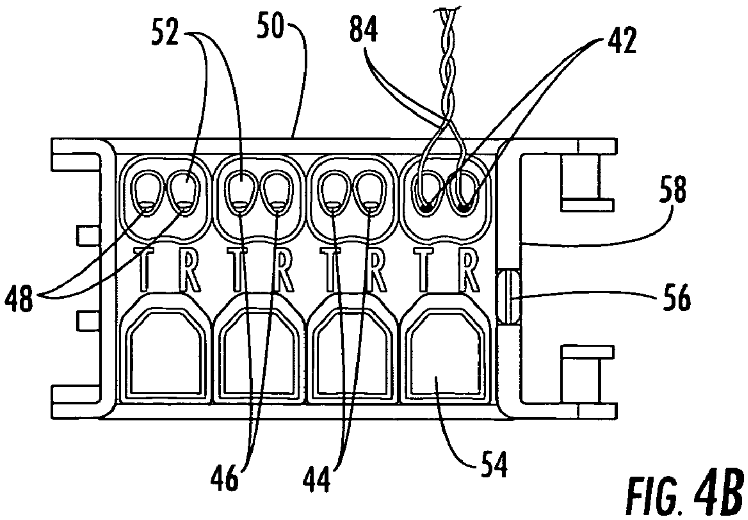
FIG. 4B is a detail plan view of the base cap of the subscriber bridge of FIG. 4A showing the plurality of pairs of connection terminals (i.e., subscriber pairs) defined by the conductive contact elements with the wire pair returning from the burglar alarm terminated in the first subscriber pair.
Figure 4C:
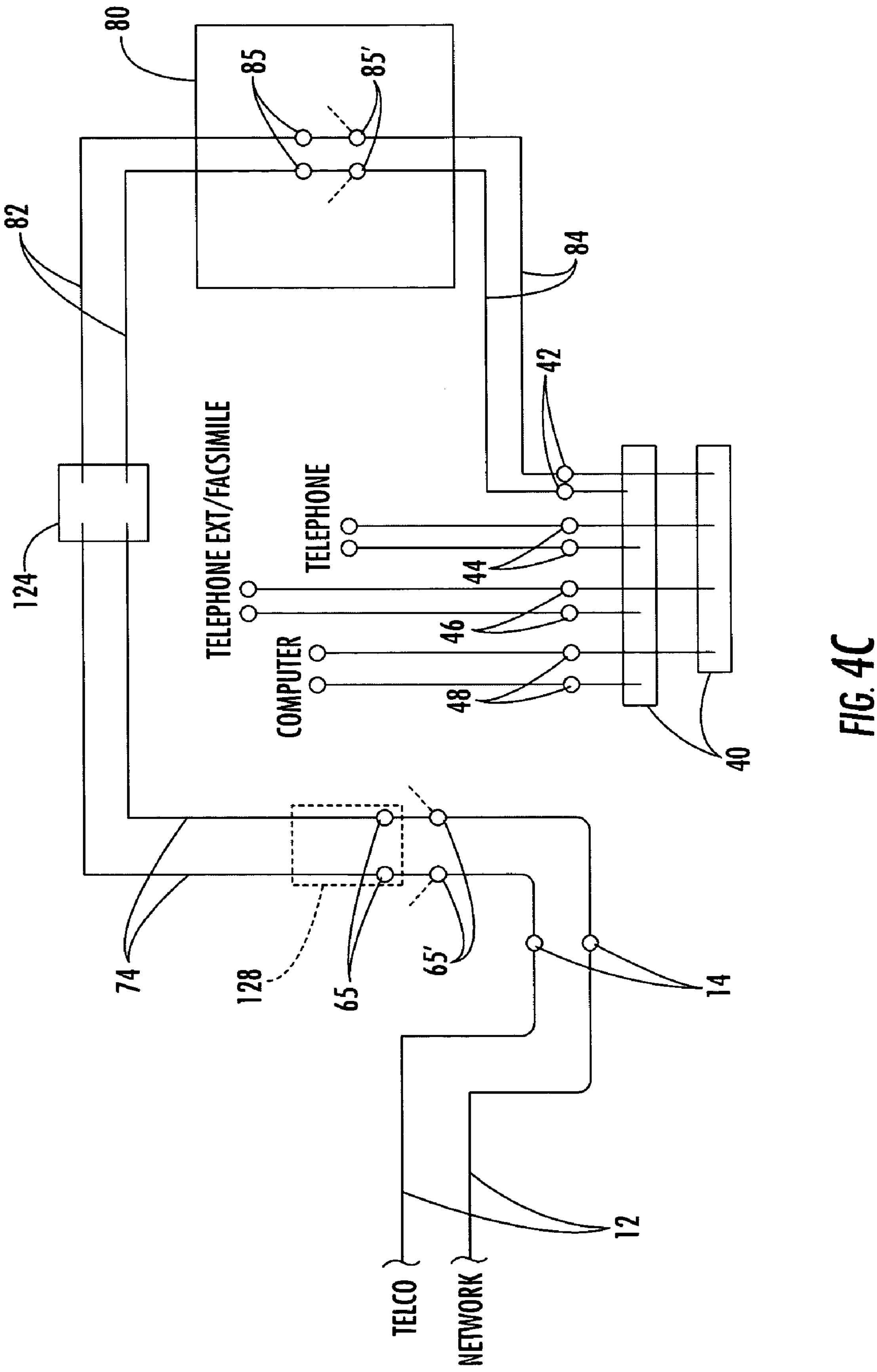
FIG. 4C is a schematic wiring diagram for the subscriber bridge of FIG. 4A and a burglar alarm relay circuit wired in series between the demarcation point and the first subscriber pair electrically connected to subscriber-owned communications equipment such that the burglar alarm can be electrically disconnected to fault test a telephone line.

Another exemplary embodiment of a subscriber bridge 220 having burglar alarm connections according to the present invention is shown in FIGS. 4A and 4B. FIG. 4C is a schematic wiring diagram for the subscriber bridge 220 shown in FIGS. 4A and 4B. The subscriber bridge 220 comprises the same base 30, pair of conductive contact elements 40 disposed within the base, base cap 50 positioned over the base and contact elements, and cover 60 previously described. The contact elements 40 define the same plurality of conductive connection terminals 42, 44, 46, 48 referred to herein as "subscriber terminals" or "subscriber pairs." Accordingly, those components of the subscriber bridge 220 will not be further described. As shown in FIGS. 4A and 4B and illustrated schematically in FIG. 4C, a conductive first wire pair 74 is electrically connected, for example by soldering or other suitable means, to the pair of contacts 65 on the underside of the cover 60 of the subscriber bridge 220 adjacent the forward end 62 of the cover. The first wire pair 74 extends rearwardly from the plug insert 60*a* between the top of the base cap 50 and the underside of the cover 60 through an opening 66 formed on the rearward end 68 of the cover. As shown, the first wire pair 74 terminates in a double-sided IDC type connector 124. The connector 124 provides convenient factory-prepared burglar alarm connection points for receiving the wire pair 82 leading to the burglar alarm. The wire pair 84 returning from the burglar alarm is electrically connected directly to the first subscriber pair 42 through the wire insertion holes 52 provided on the base cap 50. Accordingly, an installer for the security system service provider can readily electrically connect the burglar alarm relay circuit 80 to the termination module 15 in series between the demarcation point and the first subscriber pair 44 defined by the contact elements 40 that is utilized to terminate the subscriber-owned communications equipment. The connector 124, however, is not required and the installer may instead hard-wire the wire pair 82 directly to the contacts 65 on the underside of the cover 60. Regardless, three of the four subscriber pairs (i.e., 44, 46 and 48) remain available to terminate the subscriber-owned communications equipment. At the same time, all of the subscriber-owned equipment, including the burglar alarm, is electrically disconnected from the TELCO network when the cover 60 is opened so that a subscriber may fault test a telephone line on the termination module 15.

Figure 5:
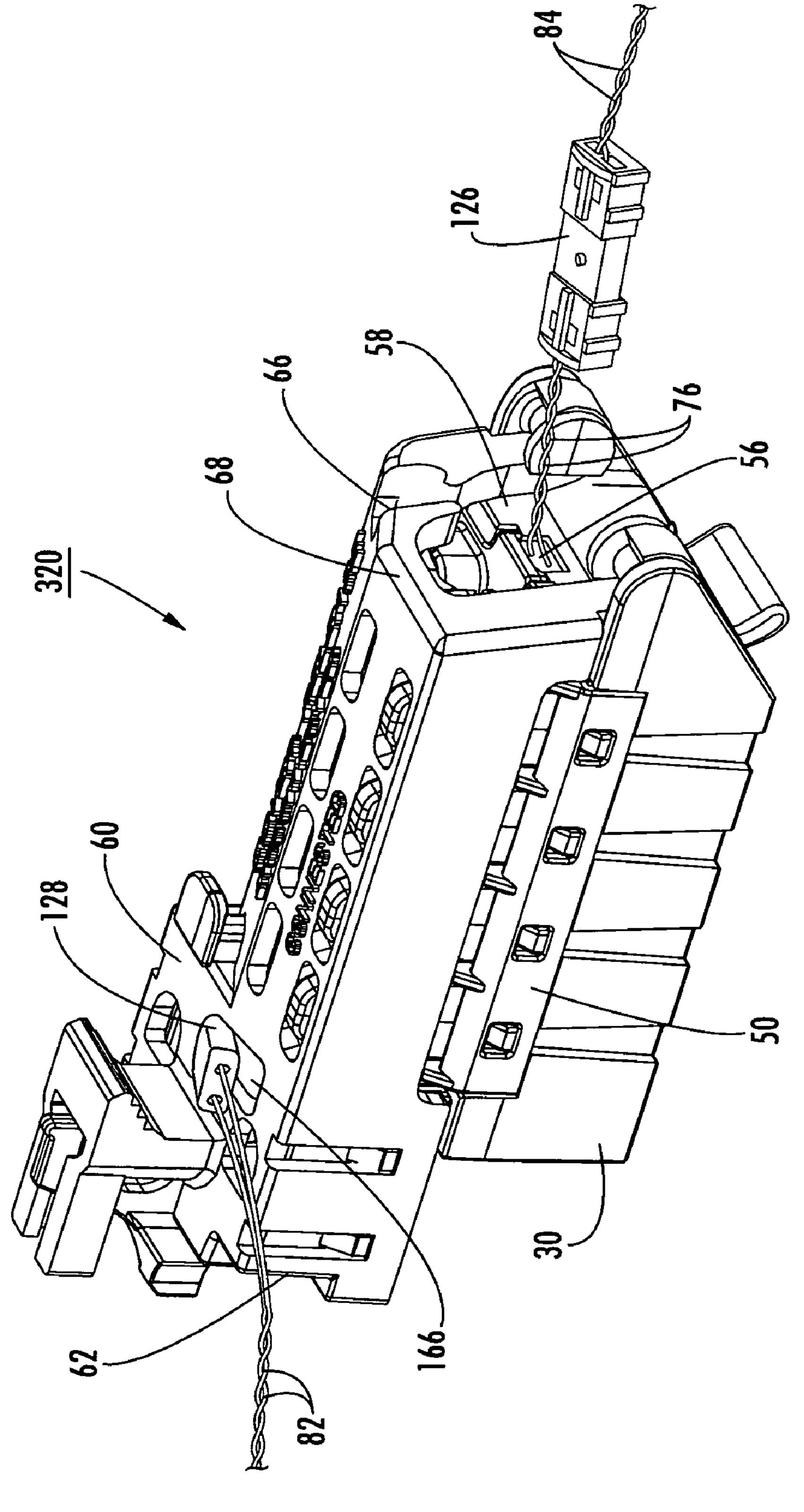
FIG. 5 is a perspective view of yet another exemplary embodiment of a subscriber bridge having burglar alarm connections according to the present invention.

Yet another exemplary embodiment of a subscriber bridge 320 having burglar alarm connections according to the present invention is shown in FIG. 5. As will be further explained, a schematic wiring diagram for the subscriber bridge 320 is shown alternatively in FIG. 3C. The subscriber bridge 320 comprises the same base 30, pair of conductive contact elements 40 disposed within the base, base cap 50 positioned over the base and contact elements, and cover 60 previously described. The contact elements 40 define the same plurality of conductive connection terminals 42, 44, 46, 48 referred to herein as "subscriber terminals" or "subscriber pairs." Accordingly, those components of the subscriber bridge 320 will not be further described. As shown in FIG. 5 and illustrated schematically in FIG. 3C, the wire pair 82 leading to the burglar alarm is terminated directly to an IDC type connector 128 (indicated by the broken lines in FIG. 3C) that is electrically connected to the contacts 65 on the plug insert 60*a*. The conductive second wire pair 76 is electrically connected, for example by soldering or other suitable means, to the contact elements 40 disposed within the base 30 of the subscriber bridge 320 as previously described and shown in FIG. 3B. As shown, the second wire pair 76 terminates in the double-sided IDC type connector 126 previously described. The second wire pair 76 extends from the contact elements 40 through an opening 56 formed on the rearward end 58 of the base cap 50. As shown, the connector 128 extends outwardly through an opening 166 provided adjacent the forward end 62 of the cover 60. The connector 128 replaces the connector 124 (indicated by the solid lines in FIG. 3C) previously described so that the number of wire connections adjacent the rearward end 68 of the cover 60 is reduced and the connectors 126, 128 are separated from one another, thereby improving the wire management and aesthetics of the burglar alarm installation. The connectors 126, 128 provide convenient factory-prepared burglar alarm connection points for receiving the wire pair 82 leading to the burglar alarm and the wire pair 84 returning from the burglar alarm. Accordingly, an installer for the security system service provider can readily electrically connect the burglar alarm relay circuit 80 to the termination module 15 in series between the demarcation point and the contact elements 40. The connectors 126, 128, however, are not required and the installer may instead hard-wire the wire pair 82 directly to the contacts 65 on the underside of the cover 60 and hard-wire the wire pair 84 directly to the contact elements 40. Regardless, all four of the subscriber pairs (i.e., 42, 44, 46 and 48) remain available to terminate the subscriber-owned communications equipment. At the same time, all of the subscriber-owned equipment, including the burglar alarm, is electrically disconnected from the TELCO network when the cover 60 is opened so that a subscriber may fault test a telephone line on the termination module 15.

Figure 6A:
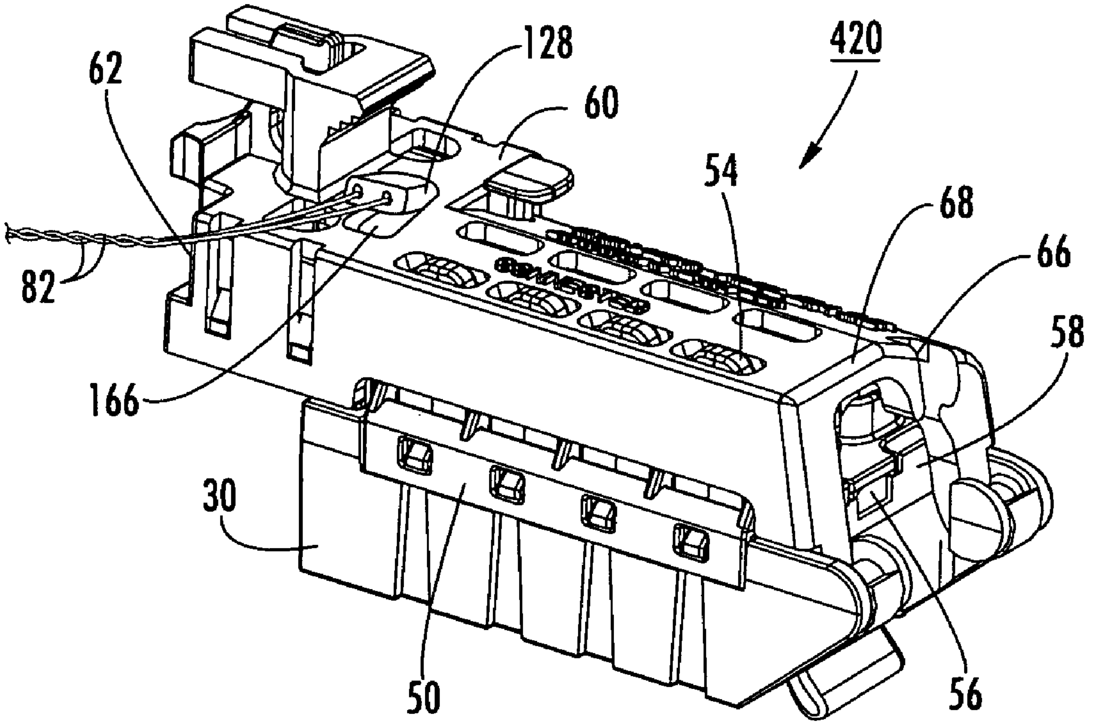
FIG. 6A is a perspective view of yet another exemplary embodiment of a subscriber bridge having burglar alarm connections according to the present invention.
Figure 6B:
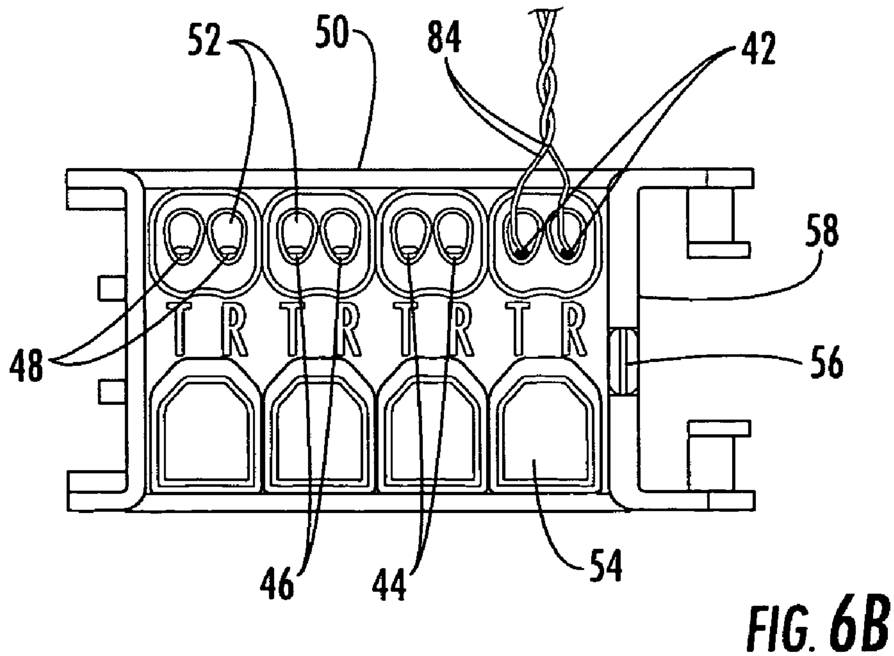
FIG. 6B is a detail plan view of the base cap of the subscriber bridge of FIG. 6A showing the plurality of pairs of connection terminals (i.e., subscriber pairs) defined by the conductive contact elements with the wire pair returning from the burglar alarm terminated in the first subscriber pair.

Yet another exemplary embodiment of a subscriber bridge 420 having burglar alarm connections according to the present invention is shown in FIGS. 6A and 6B. As will be further explained, a schematic wiring diagram for the subscriber bridge 420 is shown alternatively in FIG. 4C. The subscriber bridge 420 comprises the same base 30, pair of conductive contact elements 40 disposed within the base, base cap 50 positioned over the base and the contact elements, and cover 60 previously described. The contact elements 40 define the same plurality of conductive connection terminals 42, 44, 46, 48 referred to herein as "subscriber terminals" or "subscriber pairs." Accordingly, those components of the subscriber bridge 420 will not be further described. As shown in FIGS. 6A and 6B and illustrated schematically in FIG. 4C, the wire pair 82 leading to the burglar alarm is terminated directly to an IDC type connector 128 (indicated by the broken lines in FIG. 4C) that is electrically connected to the contacts 65 on the plug insert 60*a*. As shown, the connector 128 extends outwardly through an opening 166 provided adjacent the forward end 62 of the cover 60. The wire pair 84 returning from the burglar alarm is terminated directly to the first subscriber pair 42 through the wire insertion openings 52 provided on the base cap 50 of the subscriber bridge 420, as previously described and shown in FIG. 4B. The connector 128 replaces the connector 124 (indicated by solid lines in FIG. 4C) previously described and the wire pair 84 is terminated directly to the first subscriber pair 42 so that the number of wire connections adjacent the rearward end 68 of the cover 60 is reduced, thereby improving the wire management and aesthetics of the burglar alarm installation. As shown, the wire pair 82 terminates in an IDC type connector 128. The connector 128 provides convenient factory-prepared burglar alarm connection points for receiving the wire pair 82 leading to the burglar alarm. Accordingly, an installer for the security system service provider can readily electrically connect the burglar alarm relay circuit 80 to the termination module 15 in series between the demarcation point and the contact elements 40. The connector 128, however, is not required and the installer may instead hard-wire the wire pair 82 directly to the contacts 65 on the underside of the cover 60. Regardless, three of the four subscriber pairs (i.e., 44, 46 and 48) remain available to terminate the subscriber-owned communications equipment. At the same time, all of the subscriber-owned equipment, including the burglar alarm, is electrically disconnected from the TELCO network when the cover 60 is opened so that a subscriber may fault test a telephone line on the termination module 15.

In yet another aspect, the present invention is a method of wiring a subscriber bridge 120, 220, 320 420 of a termination module 15 to provide a demarcation point between the TELCO wiring and the subscriber wiring. The subscriber bridge 120, 220, 320 420 includes burglar alarm connections for electrically connecting a burglar alarm in series with the termination module 15 such that the subscriber-owned equipment, including the burglar alarm, can be disconnected from the TELCO wiring to test a telephone line. The method includes the first step of providing the subscriber bridge 120, 220, 320, 420 with a pair of contact elements 40 defining a plurality of pairs of connection terminals 42, 44, 46, 48. The method includes the second step of electrically connecting a conductive first wire pair 82 to the termination module 15 between a normally-closed switch 65, 65' provided at the demarcation point and a normally-closed switch 85, 85' provided on a burglar alarm relay circuit 80. The method includes the third step of electrically connecting a conductive second wire pair 84 between the normally-closed switch 85, 85' provided on the burglar alarm relay circuit 80 and the contact elements 40. Alternatively, the second wire pair 84 may be electrically connected between the normally-closed switch 85, 85' provided on the relay circuit 80 and the first pair 42 of the plurality of pairs of connection terminals 42, 44, 46, 48 defined by the contact elements 40.

In yet another aspect, the present invention is a method of electrically connecting a burglar alarm in series with a termination module 15 for interconnecting TELCO wiring and subscriber wiring such that the burglar alarm can be disconnected to test a telephone line. The method includes the first step of providing a subscriber bridge 120, 220, 320, 420 having burglar alarm connections wherein the subscriber bridge includes a base 30, a pair of conductive contact elements 40 disposed within the base and defining a plurality of pairs of connection terminals 42, 44, 46, 48, and a base cap 50 positioned over the base and the contact elements. The method includes the second step of providing burglar alarm first connection points 124 for terminating a wire pair 82 leading to the burglar alarm, the first connection points being electrically connected to the demarcation point on the subscriber bridge 120, 220, 320, 420. Alternatively, the wire pair 82 may be directly electrically connected to the demarcation point, for example by soldering or other suitable means. The method includes the third step of providing burglar alarm second connection points 126 for terminating a wire pair 84 returning from the burglar alarm, the second burglar alarm connection points being electrically connected to the contact elements 40. Alternatively, the wire pair 84 may be directly electrically connected to the contact elements 40, for example by soldering or other suitable means, or to the first pair 42 of the plurality of pairs of connection terminals 42, 44, 46, 48. Thus, when the wire pair 82 is electrically connected to the first connection points 124 and the wire pair 84 is electrically connected to the second connection points 126, the burglar alarm is electrically connected in series between the demarcation point and the contact elements 40 of the subscriber bridge 120, 220, 320, 420. Furthermore, at least one of the first and second connection points 124, 126 may be a double-sided IDC.

In yet another aspect, the present invention is a method of converting a termination module 15 including a module base 18 and a subscriber bridge 20 that provide a demarcation point between TELCO wiring and subscriber wiring to electrically connect a burglar alarm in series between the demarcation point and the subscriber bridge, the subscriber bridge having a line cord 70 electrically connecting the demarcation point and a pair of conductive contact elements 40 defining a plurality of pairs of connection terminals 42, 44, 46, 48. The method includes the first step of removing the line cord 70, for example by cutting the line cord adjacent the demarcation point and adjacent the contact elements 40. The method includes the second step of providing burglar alarm first connection points 124 for receiving a wire pair 82 leading to the burglar alarm, the first connection points being electrically connected to the demarcation point. Alternatively, the wire pair 82 may be directly electrically connected to the demarcation point, for example by soldering or other suitable means. The method includes the third step of providing burglar alarm second connection points 126 for terminating a wire pair 84 returning from the burglar alarm, the second connection points being electrically connected to the contact elements 40. Alternatively, the wire pair 84 may be directly electrically connected to the contact elements 40, for example by soldering or other suitable means, or to the first pair 42 of the plurality of pairs of connection terminals 42, 44, 46, 48. Thus, when the wire pair 82 is electrically connected to the first connection points 124, and the wire pair 84 is electrically connected to the second connection points 126, the burglar alarm is electrically connected in series between the demarcation point and the contact elements 40 of the subscriber bridge 20. Furthermore, at least one of the first and second connection points 124, 126 may be a double-sided IDC.

While preferred embodiments of the present invention have been shown and described, references herein to "underside," "top," "forward," "rearward," "first," "second" and the like, are intended solely for purposes of providing a full and complete disclosure of the invention and in no way suggest limitations regarding the operative orientation or order of the exemplary embodiments or components thereof. Furthermore, those skilled in the art will readily recognize that other changes and modifications may be made to the foregoing examples without departing from the scope and spirit of the invention. For instance, different AWG sized wires may be utilized with appropriately sized wire insertion openings and burglar alarm connection points. Also, the electrical connection of any of the conductive wires shown and described herein may be made in a variety of manners, such as by screwing, splicing, compressing, or twisting. Moreover, although IDC type connection points have been described herein as being "factory prepared," a field technician having ordinary skill can convert an existing subscriber bridge by removing and replacing the line cord with IDC type connection points, or by cutting the line cord and splicing IDC type connection points onto the free ends of the line cord. It is intended therefore to include within the scope of the appended claims, all such changes, modifications and equivalent embodiments of the inventions shown and described herein.

That which is claimed is:

1. A termination module for interconnecting service provider wiring and subscriber wiring comprising:

a subscriber bridge adapted to provide a demarcation point between the service provider wiring and the subscriber wiring, the subscriber bridge comprising a pair of conductive contact elements defining a plurality of pairs of connection terminals; and burglar alarm connections disposed on the subscriber bridge for electrically connecting a burglar alarm in series between the demarcation point and the contact elements without utilizing more than one of the plurality of pairs of connection terminals.

2. A termination module according to claim 1, wherein the burglar alarm connections comprise a first wire pair electrically connected to the demarcation point and a second wire pair electrically connected to the contact elements.

3. A termination module according to claim 2, wherein the burglar alarm connections further comprise a pair of conductive first connection points electrically connected to the first wire pair opposite the demarcation point for receiving a wire pair leading to the burglar alarm.

4. A termination module according to claim 3, wherein the first connection points comprise a double-sided insulation displacement contact connector.

5. A termination module according to claim 2, wherein the burglar alarm connection further comprise a pair of conductive second connection points electrically connected to the second wire pair opposite the contact elements for receiving a wire pair returning from the burglar alarm.

6. A termination module according to claim 5, wherein the second connection points comprise a double-sided insulation displacement contact connector.

7. A termination module according to claim 1, wherein the burglar alarm connections comprise a first wire pair electrically connected to the demarcation point and a wire pair returning from the burglar alarm electrically connected to a first pair of the pairs of connection terminals.

8. A termination module according to claim 1, wherein the burglar alarm connections comprise a pair of conductive first connection points electrically connected directly to the demarcation point for receiving a wire pair leading to the burglar alarm.

9. A termination module according to claim 8, wherein the burglar alarm connections further comprise a wire pair returning from the burglar alarm electrically connected directly to the contact elements.

10. A termination module according to claim 8, wherein the burglar alarm connections further comprise a second wire pair electrically connected to the contact elements and a pair of conductive second connection points electrically connected to the second wire pair opposite the contact elements for receiving a wire pair returning from the burglar alarm.

11. A termination module according to claim 10, wherein at least one of the first connection points and the second connection points comprise an insulation displacement contact connector.

12. A termination module according to claim 8, wherein the burglar alarm connections further comprise a wire pair returning from the burglar alarm electrically connected to a first pair of the pairs of connection terminals.

13. A subscriber bridge adapted to provide a demarcation point between Service provider wiring and subscriber wiring, the subscriber bridge comprising:

a conductive pair of contact elements defining a plurality of pairs of connection terminals; and a plurality of burglar alarm connections disposed on the subscriber bridge;

wherein the burglar alarm connections electrically connect a burglar alarm in series between the demarcation point and the contact elements; and wherein the burglar alarm connections utilize no more than one of the plurality of pairs of connection terminals.

14. A subscriber bridge according to claim 13, wherein the burglar alarm connections comprise a first wire pair electrically connected to the demarcation point and a second wire pair electrically connected to the contact elements.

15. A subscriber bridge according to claim 13, wherein the burglar alarm connections comprise a first wire pair electrically connected to the demarcation point;

a pair of conductive first connection points electrically connected to the first wire pair opposite the demarcation point for receiving a wire pair leading to the burglar alarm; and a second wire pair electrically connected to the contact elements.

16. A subscriber bridge according to claim 15, wherein the first connection points comprise a double-sided insulation displacement contact connector.

17. A subscriber bridge according to claim 15, wherein the burglar alarm connections further comprise a pair of conductive second connection points electrically connected to the second wire pair opposite the contact elements for receiving a wire pair returning from the burglar alarm.

18. A subscriber bridge according to claim 17, wherein at least one of the first connection points and the second connection points comprise a double-sided insulation displacement contact connector.

19. A subscriber bridge according to claim 13, wherein the burglar alarm connections comprise a first wire pair electrically connected to the demarcation point and a wire pair returning from the burglar alarm electrically connected to a first pair of the pairs of connection terminals.

20. A subscriber bridge according to claim 13, wherein the burglar alarm connections comprise a pair of conductive first connection points electrically connected directly to the demarcation point for receiving a wire pair leading to the burglar alarm.

21. A subscriber bridge according to claim 20, wherein the burglar alarm connections further comprise a wire pair returning from the burglar alarm electrically connected to the contact elements.

22. A subscriber bridge according to claim 20, wherein the burglar alarm connections further comprise a wire pair returning from the burglar alarm electrically connected to a first pair of the pairs of connection terminals.

23. A method of electrically connecting a burglar alarm in series with a termination module for interconnecting service provider wiring and subscriber wiring such that the burglar alarm can be electrically disconnected from the service provider wiring to fault test a telephone line, the method comprising:

providing a subscriber bridge comprising a pair of contact elements;

electrically connecting a first wire pair to the subscriber bridge between a normally-closed switch at a demarcation point and a normally-closed switch on the burglar alarm;

electrically connecting a second wire pair between the normally-closed switch on the burglar alarm and the contact elements.

24. The method of claim 23 wherein the contact elements define a plurality of pairs of connection terminals and the second wire pair is electrically connected to a first pair of the connection terminals.

25. The method of claim 23 further comprising electrically connecting a pair of conductive first connection points to the first wire pair opposite the demarcation point.

26. The method of claim 25 further comprising electrically connecting a pair of conductive second connection points to the second wire pair opposite the contact elements.

27. The method of claim 26 wherein at least one of the first connection points and the second connection points comprise a double-sided insulation displacement contact connector.

28. The method of claim 23 further comprising electrically connecting a pair of conductive first connection points directly to the demarcation point.

29. The method of claim 28 further comprising electrically connecting a pair of conductive second connection points to the second wire pair opposite the contact elements.

30. The method of claim 29 wherein at least one of the first connection points and the second connection points comprise an insulation displacement contact connector.

31. A method of providing a termination module for interconnecting service provider wiring and subscriber wiring with burglar alarm connections for electrically connecting a burglar alarm in series with the termination module such that the burglar alarm can be disconnected to fault test a telephone line, the method comprising:

providing a subscriber bridge comprising a pair of conductive contact elements; and providing burglar alarm first connection points for terminating a wire pair leading to the burglar alarm, the first connection points being electrically connected to a demarcation point on the subscriber bridge.

32. The method of claim 31 wherein the contact elements define a plurality of pairs of connection terminals comprising a first pair of connection terminals for terminating a wire pair returning from the burglar alarm.

33. The method of claim 31 further comprising providing burglar alarm second connection points for terminating a wire pair returning from the burglar alarm, the second connection points being electrically connected to the contact elements.

34. The method of claim 33 wherein at least one of the first connection points and the second connection points comprise an insulation displacement contact connector.

35. A method of converting a termination module including a subscriber bridge that provides a demarcation point between Service provider wiring and subscriber wiring to electrically connect a burglar alarm in series with the termination module, the subscriber bridge having a line cord electrically connecting the demarcation point and a pair of conductive contact elements, the method comprising:

removing the line cord; and providing burglar alarm first connection points for receiving a wire pair leading to the burglar alarm, the first connection points being electrically connected to the demarcation point.

36. The method of claim 35 wherein the contact elements define a plurality of pairs of connection terminals comprising a first pair of connection terminals for terminating a wire pair returning from the burglar alarm.

37. The method of claim 35 further comprising providing burglar alarm second connection points for terminating a wire pair returning from the burglar alarm, the second connection points being electrically connected to the contact elements.

38. The method of claim 37 wherein at least one of the first connection points and the second connection points comprise an insulation displacement contact connector.

* * * * *